US012652131B2

(12) United States Patent
Yang et al.

(10) Patent No.: US 12,652,131 B2
(45) Date of Patent: Jun. 9, 2026

(54) UPLINK ACKNOWLEDGEMENT INFORMATION TRANSMISSION METHOD AND APPARATUS

(71) Applicant: HUAWEI TECHNOLOGIES CO., LTD., Shenzhen (CN)

(72) Inventors: Hongjian Yang, Beijing (CN); Ruixiang Ma, Shenzhen (CN); Lei Guan, Beijing (CN); Jinhuan Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 269 days.

(21) Appl. No.: 18/351,299

(22) Filed: Jul. 12, 2023

(65) Prior Publication Data

US 2023/0361931 A1     Nov. 9, 2023

Related U.S. Application Data

(63) Continuation of application No. PCT/CN2021/071554, filed on Jan. 13, 2021.

(51) Int. Cl.
H04L 1/1812     (2023.01)
H04L 5/00     (2006.01)
H04W 72/232     (2023.01)

(52) U.S. Cl.
CPC .......... H04L 1/1812 (2013.01); H04L 5/0053 (2013.01); H04W 72/232 (2023.01)

(58) Field of Classification Search
CPC ... H04L 1/1812; H04L 5/0053; H04L 1/1864; H04W 72/232
See application file for complete search history.

(56) References Cited

U.S. PATENT DOCUMENTS

| | | | |
|---|---|---|---|
| 2021/0067273 A1* | 3/2021 | Lin | H04L 1/1812 |
| 2022/0140958 A1* | 5/2022 | Zhou | H04W 72/20 |
| | | | 370/329 |
| 2022/0191897 A1* | 6/2022 | Mu | H04L 1/1861 |

FOREIGN PATENT DOCUMENTS

| | | |
|---|---|---|
| CN | 109639398 A | 4/2019 |
| CN | 111436153 A | 7/2020 |

(Continued)

OTHER PUBLICATIONS

Sony, "UCI Enhancements for URLLC," 3GPP TSG RAN WG1 #98bis, Chongqing, China, R1-1910769, Total 10 pages, 3rd Generation Partnership Project, Valbonne, France (Oct. 14-20, 2019).

(Continued)

*Primary Examiner* — Dady Chery
(74) *Attorney, Agent, or Firm* — Leydig, Voit & Mayer, Ltd.

(57) ABSTRACT

An uplink acknowledgement information transmission method and apparatus are provided. The method includes: a terminal device may obtain a plurality of first HARQ-ACK codebooks, wherein each of the plurality of first HARQ-ACK codebooks includes HARQ-ACK information of at least one downlink data channel, each first HARQ-ACK codebook corresponds to one first radio network temporary identifier RNTI, and first RNTIs corresponding to the first HARQ-ACK codebooks are different. Then, the terminal device may send a physical uplink channel to a network device, wherein the physical uplink channel carries a second HARQ-ACK codebook, the second HARQ-ACK codebook includes at least one of the plurality of first HARQ-ACK codebooks that are concatenated in a preset order, and the preset order is determined based on a plurality of first RNTIs corresponding to the plurality of first HARQ-ACK codebooks.

20 Claims, 6 Drawing Sheets

Terminal device 330

Core network device 310

Radio access network device 320

Terminal device 340

(56)                 References Cited

FOREIGN PATENT DOCUMENTS

| | | |
|---|---|---|
| CN | 111954307 A | 11/2020 |
| WO | 2020066026 A1 | 4/2020 |
| WO | 2020222624 A1 | 11/2020 |

OTHER PUBLICATIONS

"3rd Generation Partnership Project; Technical Specification Group Radio Access Network; NR; Physical layer procedures for control (Release 16)," 3GPP TS 38.213 V16.4.0, pp. 1-181, 3rd Generation Partnership Project, Valbonne, France (Dec. 2020).

"3rd Generation Partnership Project; Technical Specification Group Radio Access Network; NR; Medium Access Control (MAC) protocol specification (Release 16)," 3GPP TS 38.321 V16.3.0, pp. 1-156, 3rd Generation Partnership Project, Valbonne, France (Dec. 2020).

"3rd Generation Partnership Project; Technical Specification Group Radio Access Network; NR; Radio Resource Control (RRC) protocol specification (Release 16)," 3GPP TS 38.331 V16.3.1, pp. 1-932, 3rd Generation Partnership Project, Valbonne, France (Jan. 2021).

VIVO "Discussion on mechanisms to improve reliability for RRC_CONNECTED UEs," 3GPP TSG RAN WG1 #103-e, e-Meeting, R1-2007692, Total 5 pages, 3rd Generation Partnership Project, Valbonne, France (Oct. 26-Nov. 13, 2020).

Qualcomm Incorporated "Views on reliability enhancement for Multicast RRC_CONNECTED UEs," 3GPP TSG RAN WG1 #103-e, e-Meeting, R1-2009275, Total 7 pages, 3rd Generation Partnership Project, Valbonne, France (Oct. 26-Nov. 13, 2020).

ZTE, Mechanisms to Improve Reliability for RRC_CONNECTED UEs [online], 3GPP TSG RAN WG1 #102-e, R1-2005437, Internet URL:https://www.3gpp.org/ftp/tsg_ran/WG1_RL1/TSGR1_102-e/Docs/R1-2005437.zip, Aug. 17-28, 2020, total 8 pages.

Vivo, Other issues for Rel-17 MBS [online], 3GPP TSG RAN WG1 #102-e, R1-2006658, Internet URL:https://www.3gpp.org/ftp/tsg_ran/WG1_RL1/TSGR1_102-e/Docs/R1-2006658.zip, Aug. 17-28, 2020, total 3 pages.

Ericsson, On F1/E1 bearer management aspects [online], 3GPP TSG RAN WG3 #110-e, R3-206388, Internet URL: https://www.3gpp.org/ftp/tsg_ran/WG3_lu/TSGR3_110-e/Docs/R3-206388.zip, Oct. 2-12, 2020, total 5 pages.

* cited by examiner

Target uplink slot

| 0 | 1 | 2 | 3 | 4 | 5 | 6 | 7 | 8 | 9 |

| D | F | U |

PDSCH0

PDSCH1

PDSCH2

PDSCH3

Terminal device 330

Core network device 310

Radio access network device 320

Terminal device 340

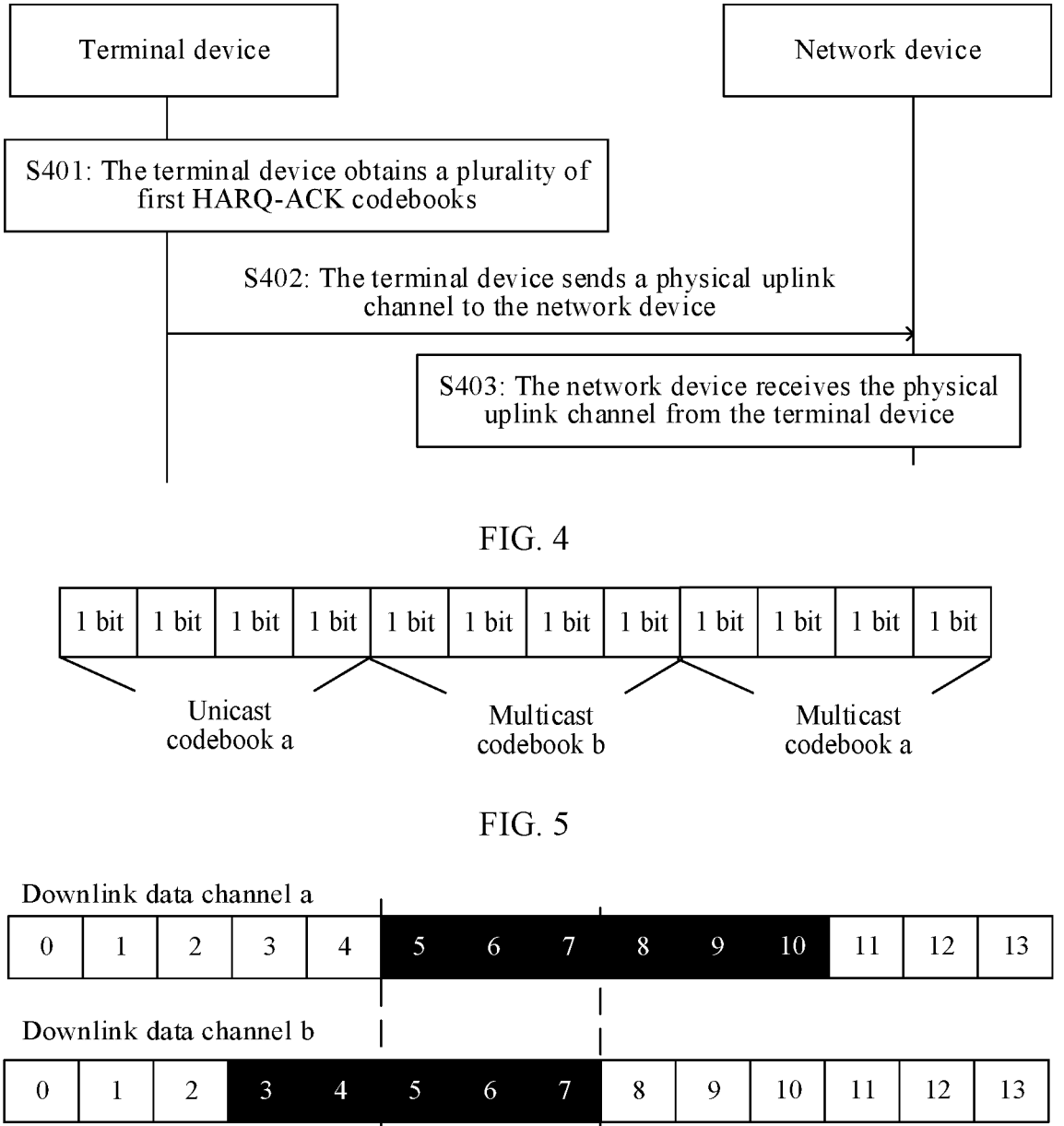

| Terminal device | | Network device |
|---|---|---|

S401: The terminal device obtains a plurality of first HARQ-ACK codebooks

S402: The terminal device sends a physical uplink channel to the network device

S403: The network device receives the physical uplink channel from the terminal device

FIG. 4

| 1 bit | 1 bit | 1 bit | 1 bit | 1 bit | 1 bit | 1 bit | 1 bit | 1 bit | 1 bit | 1 bit | 1 bit |
|---|---|---|---|---|---|---|---|---|---|---|---|

Unicast
codebook a

Multicast
codebook b

Multicast
codebook a

FIG. 5

Downlink data channel a

| 0 | 1 | 2 | 3 | 4 | 5 | 6 | 7 | 8 | 9 | 10 | 11 | 12 | 13 |
|---|---|---|---|---|---|---|---|---|---|---|---|---|---|

Downlink data channel b

| 0 | 1 | 2 | 3 | 4 | 5 | 6 | 7 | 8 | 9 | 10 | 11 | 12 | 13 |
|---|---|---|---|---|---|---|---|---|---|---|---|---|---|

FIG. 6

UPLINK ACKNOWLEDGEMENT INFORMATION TRANSMISSION METHOD AND APPARATUS

CROSS-REFERENCE TO RELATED APPLICATIONS

This application is a continuation of International Application No. PCT/CN2021/071554, filed on Jan. 13, 2021, the disclosure of which is hereby incorporated by reference in its entirety.

TECHNICAL FIELD

This application relates to the communication field, and in particular, to an uplink acknowledgement information transmission method and apparatus.

BACKGROUND

Hybrid automatic repeat request (HARQ) is a technology for implementing reliable data transmission by using an acknowledgement mechanism between a network device and a terminal device. HARQ-acknowledgement (ACK) information indicates whether the terminal device normally receives data. The HARQ-ACK information includes an ACK and a negative acknowledgement (NACK). The ACK indicates that the terminal device can receive correct data, and the NACK indicates that data received by the terminal device is abnormal.

Currently, when receiving a plurality of physical downlink shared channels (PDSCHs), the terminal device may generate a plurality of semi-static codebooks (namely, Type-1 HARQ-ACK codebooks, referred to as HARQ-ACK codebooks for short below) for the plurality of PDSCHs. Each HARQ-ACK codebook includes HARQ-ACK information of some of the plurality of PDSCHs. Then, the terminal device may report the plurality of HARQ-ACK codebooks to the network device by using one or more physical uplink shared channel (PUSCH) or physical uplink control channel (PUCCH) resources. The network device determines, based on the HARQ-ACK codebook, whether to resend a PDSCH.

However, in the foregoing technical solution, when the terminal device reports the plurality of HARQ-ACK codebooks, a large quantity of resources are used. As a result, resource utilization is low:

SUMMARY

This application provides an uplink acknowledgement information transmission method and apparatus, to resolve a problem that a large quantity of resources are consumed when a plurality of HARQ-ACK codebooks are reported, thereby improving resource utilization.

To achieve the foregoing objective, the following technical solutions are used in this application.

According to a first aspect, an uplink acknowledgement information transmission method is provided, and is applied to a terminal device. The uplink acknowledgement information transmission method includes the following.

The terminal device may obtain a plurality of first HARQ-ACK codebooks, where each of the plurality of first HARQ-ACK codebooks includes HARQ-ACK information of at least one downlink data channel, each first HARQ-ACK codebook corresponds to one first radio network temporary identifier RNTI, and first RNTIs corresponding to the first HARQ-ACK codebooks are different. Then, the terminal device may send a physical uplink channel to a network device, where the physical uplink channel carries a second HARQ-ACK codebook, the second HARQ-ACK codebook includes at least one of the plurality of first HARQ-ACK codebooks that are concatenated in a preset order, and the preset order is determined based on a plurality of first RNTIs corresponding to the plurality of first HARQ-ACK codebooks.

Based on the foregoing technical solution, after the terminal device obtains the plurality of first HARQ-ACK codebooks, the terminal device may send the physical uplink channel carrying the second HARQ-ACK codebook, where the second HARQ-ACK codebook includes the at least one first HARQ-ACK codebook that is concatenated in the preset order. In other words, the physical uplink channel sent by the terminal device carries a plurality of first HARQ-ACK codebooks. In this way, the terminal device may report the plurality of HARQ-ACK codebooks by using one resource, so that resources consumed when the plurality of HARQ-ACK codebooks are reported are reduced, thereby improving resource utilization.

In addition, the preset order is determined based on the plurality of first RNTIs corresponding to the plurality of first HARQ-ACK codebooks, and each first HARQ-ACK codebook corresponds to one first RNTI, and the first RNTIs corresponding to the first HARQ-ACK codebooks are different. In this way, after the terminal device sends the physical uplink channel carrying the second HARQ-ACK codebook, the network device may distinguish between the plurality of first HARQ-ACK codebooks based on different first RNTIs, and then determine whether to resend the downlink data channel. Therefore, in this solution, it can be avoided that the network device resends a downlink data channel normally received by the terminal device, or the network device does not resend a downlink data channel abnormally received by the terminal device, so that communication quality and resource utilization are improved.

With reference to the first aspect, in a possible design, the plurality of first HARQ-ACK codebooks may include a third HARQ-ACK codebook and a fourth HARQ-ACK codebook. The third HARQ-ACK codebook includes HARQ-ACK information of at least one first downlink data channel, and the fourth HARQ-ACK codebook includes HARQ-ACK information of at least one second downlink data channel. There is an intersection between time domain resources occupied by the at least one first downlink data channel and the at least one second downlink data channel.

With reference to the first aspect, in another possible design, the method further includes: The terminal device may obtain indication information, where the indication information indicates the terminal device to concatenate the at least one of the plurality of first HARQ-ACK codebooks in the preset order. Then, the terminal device may concatenate the at least one of the plurality of first HARQ-ACK codebooks in the preset order based on the indication information, to obtain the second HARQ-ACK codebook.

In other words, a manner in which the terminal device concatenates the plurality of first HARQ-ACK codebooks is determined based on the indication information. In this way, the terminal device may concatenate the plurality of first HARQ-ACK codebooks based on the indication information.

With reference to the first aspect, in another possible design, the method further includes: The indication information includes a first value or a second value. If the indication information includes the first value, the terminal device concatenates the plurality of first HARQ-ACK codebooks in the preset order, to obtain the second HARQ-ACK codebook.

In other words, when the indication information includes the first value, the terminal device may concatenate each of the plurality of first HARQ-ACK codebooks. In this way, the second HARQ-ACK codebook may include complete HARQ-ACK codebook information. In this way, the network device may also determine HARQ-ACK information corresponding to each downlink data channel based on the second HARQ-ACK codebook, and then determine whether to resend the downlink data channel. Therefore, in this embodiment of this application, it can be avoided that the network device resends the downlink data channel normally received by the terminal device, or the network device does not resend the downlink data channel abnormally received by the terminal device, so that resource waste is reduced and communication quality is improved.

With reference to the first aspect, in another possible design, the method further includes: If the indication information includes the second value, the terminal device removes the HARQ-ACK information of the at least one first downlink data channel from the third HARQ-ACK codebook, and concatenates a processed third HARQ-ACK codebook and a first HARQ-ACK codebook other than the third HARQ-ACK codebook in the plurality of first HARQ-ACK codebooks in the preset order, to obtain the second HARQ-ACK codebook. Alternatively, if the indication information includes the second value, the terminal device removes the HARQ-ACK information of the at least one second downlink data channel from the fourth HARQ-ACK codebook, and concatenates a processed fourth HARQ-ACK codebook and a first HARQ-ACK codebook other than the fourth HARQ-ACK codebook in the plurality of first HARQ-ACK codebooks in the preset order, to obtain the second HARQ-ACK codebook.

To be specific, the terminal device may remove, from a codebook that ranks in top (or ranks behind). PDSCH receiving occasions (namely, corresponding HARQ-ACK information) whose time domain resources have an intersection. In this way, a quantity of bits reported to the network device can be reduced, thereby reducing air interface resource overheads.

With reference to the first aspect, in another possible design, the method that "the terminal device may obtain indication information" includes: The terminal device receives higher layer signaling, where the higher layer signaling includes the indication information. Alternatively, the terminal device receives downlink control information DCI, where the DCI includes the indication information. Alternatively, the terminal device obtains capability information of the terminal device, where the capability information indicates whether the terminal device supports frequency division multiplexing, and the capability information includes the indication information.

In conclusion, the terminal device may obtain the indication information in a plurality of manners, so that the terminal device obtains the indication information in a more flexible manner.

With reference to the first aspect, in another possible design, the preset order includes: arranging in descending order of the RNTIs corresponding to the first HARQ-ACK codebooks; or arranging in ascending order of the RNTIs corresponding to the first HARQ-ACK codebooks.

With reference to the first aspect, in another possible design, the first RNTI includes a cell radio network temporary identifier C-RNTI and/or a group radio network temporary identifier G-RNTI. The preset order includes: A first HARQ-ACK codebook corresponding to the C-RNTI is before a first HARQ-ACK codebook corresponding to the G-RNTI; or a first HARQ-ACK codebook corresponding to the C-RNTI is after a first HARQ-ACK codebook corresponding to the G-RNTI.

With reference to the first aspect, in another possible design, the first RNTI includes the cell radio network temporary identifier C-RNTI and/or the group radio network temporary identifier G-RNTI. The preset order includes: First HARQ-ACK codebooks corresponding to a plurality of G-RNTIs are arranged in descending order of the G-RNTIs corresponding to the first HARQ-ACK codebooks; or first HARQ-ACK codebooks corresponding to a plurality of G-RNTIs are arranged in ascending order of the G-RNTIs corresponding to the first HARQ-ACK codebooks.

According to a second aspect, an uplink acknowledgement information transmission method is provided, and is applied to a network device. The uplink acknowledgement information transmission method includes the following.

The network device may receive a physical uplink channel from a terminal device, where the physical uplink channel carries a second HARQ-ACK codebook, the second HARQ-ACK codebook includes at least one of a plurality of first HARQ-ACK codebooks that are concatenated in a preset order, and the preset order is determined based on a plurality of first RNTIs corresponding to the plurality of first HARQ-ACK codebooks.

With reference to the second aspect, in a possible design, the plurality of first HARQ-ACK codebooks include a third HARQ-ACK codebook and a fourth HARQ-ACK codebook. The third HARQ-ACK codebook includes HARQ-ACK information of at least one first downlink data channel, and the fourth HARQ-ACK codebook includes HARQ-ACK information of at least one second downlink data channel. There is an intersection between time domain resources occupied by the at least one first downlink data channel and the at least one second downlink data channel.

With reference to the second aspect, in a possible design, the uplink acknowledgement information transmission method further includes: The network device sends indication information to the terminal device, where the indication information indicates the terminal device to concatenate the at least one of the plurality of first HARQ-ACK codebooks in the preset order.

With reference to the second aspect, in a possible design, the method that "the network device sends indication information to the terminal device" includes: The network device sends higher layer signaling to the terminal device, where the higher layer signaling includes the indication information; or the network device sends downlink control information DCI to the terminal device, where the DCI includes the indication information.

With reference to the second aspect, in a possible design, the uplink acknowledgement information transmission method further includes: The network device receives capability information of the terminal device, where the capability information indicates whether the terminal device supports frequency division multiplexing, and the capability information includes the indication information.

In addition, for a technical effect of the uplink acknowledgement information transmission method in the second aspect, refer to a technical effect of the uplink acknowledgement information transmission method in the first aspect. Details are not described herein again.

According to a third aspect, an uplink acknowledgement information transmission apparatus is provided. The uplink acknowledgement information transmission apparatus includes an obtaining unit and a sending unit.

The obtaining unit is configured to obtain a plurality of first HARQ-ACK codebooks, where each of the plurality of first HARQ-ACK codebooks includes HARQ-ACK information of at least one downlink data channel, each first HARQ-ACK codebook corresponds to one first radio network temporary identifier RNTI, and first RNTIs corresponding to the first HARQ-ACK codebooks are different.

The sending unit is configured to send a physical uplink channel to a network device, where the physical uplink channel carries a second HARQ-ACK codebook, the second HARQ-ACK codebook includes at least one of the plurality of first HARQ-ACK codebooks that are concatenated in a preset order, and the preset order is determined based on a plurality of first RNTIs corresponding to the plurality of first HARQ-ACK codebooks.

With reference to the third aspect, in a possible design, the plurality of first HARQ-ACK codebooks include a third HARQ-ACK codebook and a fourth HARQ-ACK codebook. The third HARQ-ACK codebook includes HARQ-ACK information of at least one first downlink data channel, and the fourth HARQ-ACK codebook includes HARQ-ACK information of at least one second downlink data channel. There is an intersection between time domain resources occupied by the at least one first downlink data channel and the at least one second downlink data channel.

With reference to the third aspect, in another possible design, the uplink acknowledgement information transmission apparatus further includes a processing unit. The obtaining unit is further configured to obtain indication information, where the indication information indicates to concatenate the at least one of the plurality of first HARQ-ACK codebooks in the preset order. The processing unit is configured to concatenate the at least one of the plurality of first HARQ-ACK codebooks in the preset order based on the indication information, to obtain the second HARQ-ACK codebook.

With reference to the third aspect, in another possible design, the indication information includes a first value or a second value. The processing unit is further configured to: if the indication information includes the first value, concatenate the plurality of first HARQ-ACK codebooks in the preset order, to obtain the second HARQ-ACK codebook.

With reference to the third aspect, in another possible design, the processing unit is further configured to: if the indication information includes the second value, remove the HARQ-ACK information of the at least one first downlink data channel from the third HARQ-ACK codebook, and concatenate a processed third HARQ-ACK codebook and a first HARQ-ACK codebook other than the third HARQ-ACK codebook in the plurality of first HARQ-ACK codebooks in the preset order, to obtain the second HARQ-ACK codebook; or if the indication information includes the second value, remove the HARQ-ACK information of the at least one second downlink data channel from the fourth HARQ-ACK codebook, and concatenate a processed fourth HARQ-ACK codebook and a first HARQ-ACK codebook other than the fourth HARQ-ACK codebook in the plurality of first HARQ-ACK codebooks in the preset order, to obtain the second HARQ-ACK codebook.

With reference to the third aspect, in another possible design, the obtaining unit is specifically configured to: receive higher layer signaling, where the higher layer signaling includes the indication information: receive downlink control information DCI, where the DCI includes the indication information; or obtain capability information of a terminal device, where the capability information indicates whether the terminal device supports frequency division multiplexing, and the capability information includes the indication information.

With reference to the third aspect, in another possible design, the preset order includes: arranging in descending order of the RNTIs corresponding to the first HARQ-ACK codebooks; or arranging in ascending order of the RNTIs corresponding to the first HARQ-ACK codebooks.

With reference to the third aspect, in another possible design, the first RNTI includes a cell radio network temporary identifier C-RNTI and/or a group radio network temporary identifier G-RNTI. The preset order includes: A first HARQ-ACK codebook corresponding to the C-RNTI is before a first HARQ-ACK codebook corresponding to the G-RNTI; or a first HARQ-ACK codebook corresponding to the C-RNTI is after a first HARQ-ACK codebook corresponding to the G-RNTI.

With reference to the third aspect, in another possible design, the first RNTI includes the cell radio network temporary identifier C-RNTI and/or the group radio network temporary identifier G-RNTI. The preset order includes: First HARQ-ACK codebooks corresponding to a plurality of G-RNTIs are arranged in descending order of the G-RNTIs corresponding to the first HARQ-ACK codebooks; or first HARQ-ACK codebooks corresponding to a plurality of G-RNTIs are arranged in ascending order of the G-RNTIs corresponding to the first HARQ-ACK codebooks.

In addition, for a technical effect of the uplink acknowledgement information transmission apparatus in the third aspect, refer to a technical effect of the uplink acknowledgement information transmission method in the first aspect. Details are not described herein again.

According to a fourth aspect, an uplink acknowledgement information transmission apparatus is provided. The uplink acknowledgement information transmission apparatus includes:

a receiving unit, configured to receive a physical uplink channel from a terminal device, where the physical uplink channel carries a second HARQ-ACK codebook, the second HARQ-ACK codebook includes at least one of a plurality of first HARQ-ACK codebooks that are concatenated in a preset order, and the preset order is determined based on a plurality of first RNTIs corresponding to the plurality of first HARQ-ACK codebooks.

With reference to the fourth aspect, in a possible design, the plurality of first HARQ-ACK codebooks include a third HARQ-ACK codebook and a fourth HARQ-ACK codebook. The third HARQ-ACK codebook includes HARQ-ACK information of at least one first downlink data channel, and the fourth HARQ-ACK codebook includes HARQ-ACK information of at least one second downlink data channel. There is an intersection between time domain resources occupied by the at least one first downlink data channel and the at least one second downlink data channel.

With reference to the fourth aspect, in a possible design, the uplink acknowledgement information transmission apparatus further includes a sending unit. The sending unit is configured to send indication information to the terminal device, where the indication information indicates the terminal device to concatenate the at least one of the plurality of first HARQ-ACK codebooks in the preset order.

With reference to the fourth aspect, in a possible design, the sending unit is specifically configured to: send higher layer signaling to the terminal device, where the higher layer signaling includes the indication information; or send downlink control information DCI to the terminal device, where the DCI includes the indication information.

With reference to the fourth aspect, in a possible design, the receiving unit is further configured to receive capability information of the terminal device, where the capability information indicates whether the terminal device supports frequency division multiplexing, and the capability information includes the indication information.

In addition, for a technical effect of the terminal device in the fourth aspect, refer to a technical effect of the uplink acknowledgement information transmission method in the first aspect. Details are not described herein again.

According to a fifth aspect, an uplink acknowledgement information transmission apparatus is provided. The uplink acknowledgement information transmission apparatus includes a processor, where the processor is coupled to a memory. The memory is configured to store a computer program. The processor is configured to execute the computer program stored in the memory, so that the uplink acknowledgement information transmission apparatus performs the uplink acknowledgement information transmission method according to any possible implementation of the first aspect.

In a possible design, the uplink acknowledgement information transmission apparatus in the fifth aspect may further include a transceiver. The transceiver may be a transceiver circuit or an input/output port. The transceiver may be used in communication between the uplink acknowledgement information transmission apparatus and another uplink acknowledgement information transmission apparatus.

In this application, the uplink acknowledgement information transmission apparatus in the fifth aspect may be a terminal device or a network device, or a chip (system) or another component or assembly disposed in the terminal device or the network device.

In addition, for a technical effect of the uplink acknowledgement information transmission apparatus in the fifth aspect, refer to a technical effect of the uplink acknowledgement information transmission method according to any implementation of the first aspect. Details are not described herein again.

According to a sixth aspect, a computer-readable storage medium is provided. The computer-readable storage medium includes a computer program or instructions. When the computer program or the instructions are run on a computer, the computer is enabled to perform the uplink acknowledgement information transmission method according to any possible implementation of the first aspect.

According to a seventh aspect, a computer program product is provided. The computer program product includes a computer program or instructions. When the computer program or the instructions are run on a computer, the computer is enabled to perform the uplink acknowledgement information transmission method according to any possible implementation of the first aspect.

BRIEF DESCRIPTION OF DRAWINGS

FIG. 4 is a schematic flowchart of an uplink acknowledgement information transmission method according to an embodiment of this application;

FIG. 5 is a schematic diagram of an example of concatenation of HARQ-ACK codebooks according to an embodiment of this application;

FIG. 6 is a schematic diagram of an intersection between time domain resources according to an embodiment of this application;

DESCRIPTION OF EMBODIMENTS

Figures 1, 2, 3:
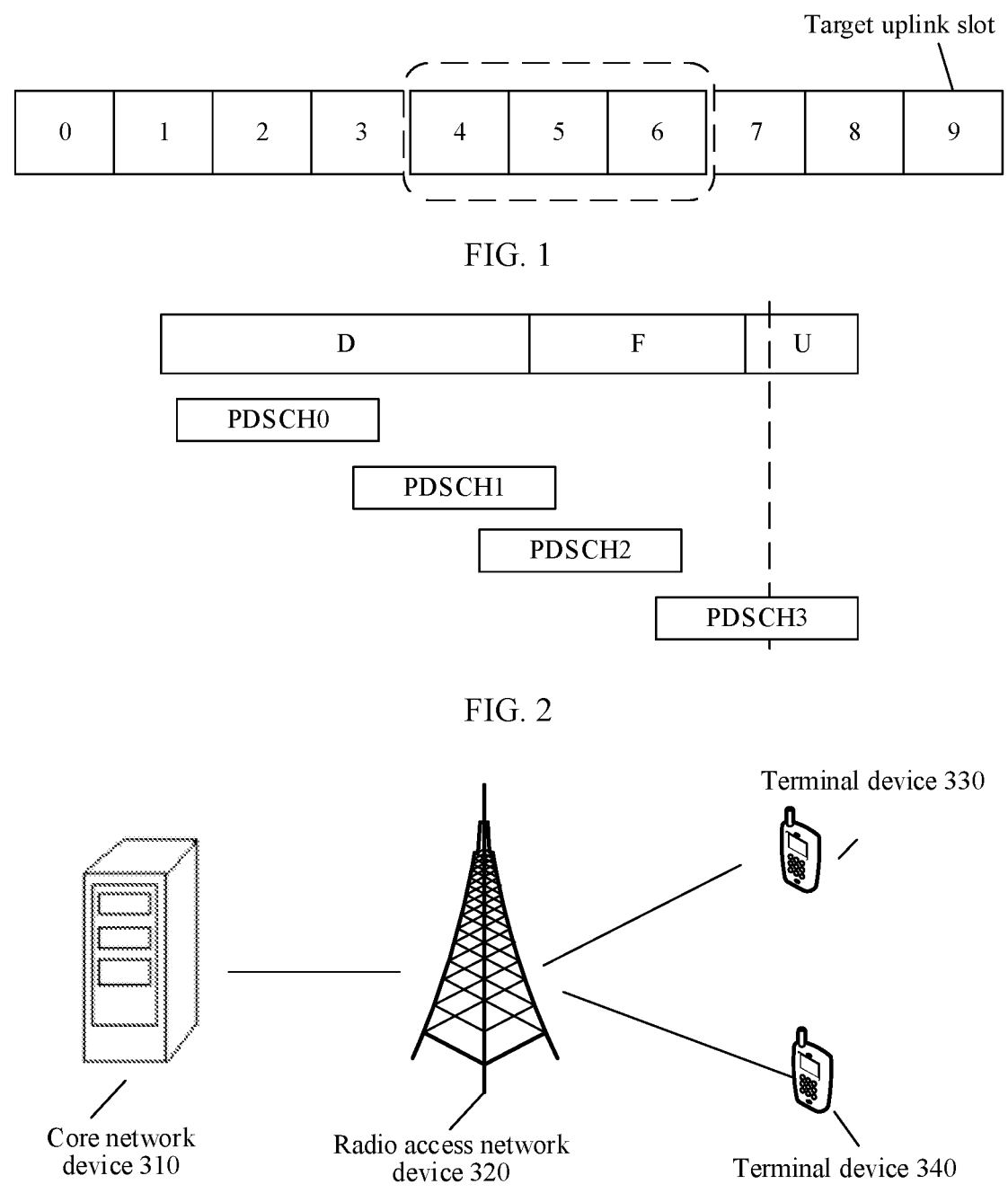
FIG. 1 is a schematic diagram of an example of a feedback window according to an embodiment of this application.
FIG. 2 is a schematic diagram of a relationship between a slot and a PDSCH according to an embodiment of this application.
FIG. 3 is a schematic diagram of an architecture of a communication system according to an embodiment of this application.

The following describes technical solutions in this application with reference to accompanying drawings.

The technical solutions in embodiments of this application may be applied to various communication systems, for example, a wireless fidelity (Wi-Fi) system, a vehicle to everything (vehicle to everything, V2X) communication system, a device-to-device (D2D) communication system, an Internet of Vehicles communication system, a 4th generation (4G) mobile communication system, such as a long term evolution (LTE) system, a worldwide interoperability for microwave access (WiMAX) communication system, a 5th generation (5G) mobile communication system, such as a new radio (NR) system, and a future communication system, such as a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, the word "example", "for example", or the like is used to represent giving an example, an illustration, or a description. Any embodiment or design scheme described as an "example" in this application should not be explained as being more preferred or having more advantages than another embodiment or design scheme. Exactly, use of the word "example" is intended to present a concept in a specific manner.

In embodiments of this application, the terms "information", "signal", "message", "channel", and "signaling" may be interchangeably used sometimes. It should be noted that expressed meanings are consistent when differences are not emphasized. The terms "of", "relevant (corresponding, relevant)", and "corresponding" may be interchangeably used sometimes. It should be noted that expressed meanings are consistent when differences are not emphasized.

In embodiments of this application, sometimes, a subscript such as $W_1$ may be written in an incorrect form such as W1. Expressed meanings are consistent when differences are not emphasized.

For ease of understanding the technical solutions in this application, the following describes some technical terms.

1. Hybrid Automatic Repeat Request (HARQ)

The HARQ is a hybrid use of a forward error correction (FEC) coding technology and an automatic repeat request (ARQ) in a cellular communication system, to ensure reliable data transmission. Specifically, a transmitting end sends a data packet to a receiving end. After receiving the data packet, the receiving end processes the data packet to obtain a processing result. The receiving end feeds back the HARQ-ACK information to the transmitting end based on the processing result. After receiving the HARQ-ACK information, the transmitting end demodulates the HARQ-ACK information, to determine to resend the data packet to the receiving end or to send a new data packet to the receiving end.

2. Semi-Static Codebook

The semi-static codebook includes HARQ-ACK feedback information of at least one PDSCH. The following steps are required to generate the semi-static codebook.

Step 1: Determine an uplink slot number, where a target uplink slot corresponding to the uplink slot number is a slot in which the HARQ-ACK feedback information is transmitted.

Step 2: Determine a feedback window: The feedback window may be represented by a K1 table. A downlink transmission set corresponding to a slot for transmitting a HARQ-ACK is determined based on the preconfigured K1 table and a PDSCH candidate time domain resource set. The K1 table indicates a slot interval between a slot in which downlink transmission on which a HARQ-ACK feedback needs to be performed is located and the slot in which the HARQ-ACK is transmitted. Different K1 tables may be selected depending on whether a search space of a terminal device has a capability of detecting to-be-determined downlink control information (DCI).

For example, the K1 table is {3, 4, 5}. As shown in FIG. 1, a slot number of the target uplink slot is 9. When K1 is 3, the slot number is 6. When K1 is 4, the slot number is 5. When K1 is 5, the slot number is 4. To be specific, the terminal device may transmit, in the target uplink slot, HARQ-ACK feedback information of a PDSCH received in three slots whose slot numbers are 4, 5, and 6.

Step 3: Determine a slot type of a slot corresponding to the K1 table. The slot type includes a downlink slot and an uplink slot.

Step 4: Determine a quantity of non-uplink slots in the slot corresponding to the K1 table.

A maximum set of PDSCHs that can be scheduled in a slot is determined by traversing each slot corresponding to the K1 table. A symbol position (namely, a time domain position) at which the PDSCH may be scheduled depends on a time domain allocation list pdsch-TimeDomainAllocationList configured by radio resource control (RRC), and the time domain allocation list includes ko, a mapping type, and a start symbol and position. K0 indicates a slot interval between downlink scheduling DCI and a PDSCH scheduled by the DCI. The mapping type indicates a mapping type of the PDSCH. The start symbol and position indicate a start and length indicator value (SLIV).

For example, the time domain allocation list may be expressed as:

PDSCH-TimeDomainResourceAllocationList::=SEQUENCE (SIZE (1 . . . maxNrofDL-Allocations)) OF PDSCH-TimeDomainResourceAllocation PDSCH-TimeDomainResourceAllocation::=SEQUENCE {

K0 INTEGER (0 . . . 32)

OPTIONAL, mappingType ENUMERATED {typeA, typeB}, startSymbolAndLength INTEGER (0 . . . 127)

}.

For a PDSCH in each slot, the terminal device determines a symbol position conflict based on a PDSCH start symbol and a quantity of symbols that are obtained through calculation, and excludes a PDSCH that conflicts with an uplink symbol. For example, as shown in FIG. 2, one slot includes four possible scheduled PDSCHs. D represents a downlink symbol, F represents a flexible symbol, and U represents an uplink symbol. Among the four PDSCHs included in the slot, the first three PDSCHs: a PDSCH0, a PDSCH1, and a PDSCH2, are included in the symbols D and F, and only a PDSCH3 has an intersection with the uplink symbol. In this case, the PDSCH3 is excluded from a PDSCH set that may be scheduled. Finally, the terminal device records all PDSCH sets that may be simultaneously scheduled in the feedback window.

When receiving a plurality of PDSCHs, the terminal device may generate one piece of HARQ-ACK information for each PDSCH. Then, the terminal device may report a plurality of pieces of HARQ-ACK information to a network device by using a plurality of PUSCH resources, and the network device determines, based on the HARQ-ACK information corresponding to each PDSCH, whether to resend the PDSCH. In this way, when the terminal device reports the plurality of pieces of HARQ-ACK information, a large quantity of resources are used. As a result, resource utilization is low. Currently, the resource utilization can usually be improved by using the following two conventional technologies.

In a conventional technology 1, if the terminal device reports, to the network device, a capability of the terminal device to receive a plurality of unicast PDSCHs in one slot, the terminal device may receive the plurality of unicast PDSCHs in the slot. Then, the terminal device may group the plurality of received unicast PDSCHs based on each unicast PDSCH receiving occasion. Each group of PDSCHs includes at least one unicast PDSCH, and there is an intersection between time domain resources of a plurality of unicast PDSCHs in each group of PDSCHs. Then, the terminal device may generate one piece of HARQ-ACK information for each group of PDSCHs, and concatenate a plurality of pieces of HARQ-ACK information to form one piece of HARQ-ACK information. Finally, the terminal device may send the concatenated HARQ-ACK information to the network device by using one PUSCH resource.

However, in the foregoing technical solution, the plurality of unicast PDSCHs in each group may feed back only one piece of HARQ-ACK information. If pieces of HARQ-ACK information of a plurality of unicast PDSCHs in one group are different, to be specific, in the plurality of unicast PDSCHs in one group. HARQ-ACK information corresponding to some unicast PDSCHs is ACK, and HARQ-ACK information corresponding to some unicast PDSCHs is NACK, the terminal device can feed back only ACK or NACK. In this way, the network device may resend a PDSCH normally received by the terminal device, or the network device does not resend a PDSCH abnormally received by the terminal device. As a result, a resource of the network device is wasted, or the terminal device loses data.

In a conventional technology 2, in a multiple transmission reception point (MTRP) technology of the 3rd Generation Partnership Project (3GPP). PDSCHs separately scheduled by a plurality of pieces of DCI are supported in jointly forming a semi-static codebook, and one PUCCH or PUSCH resource is used to report the semi-static codebook to the network device.

For example, when receiving a plurality of PDSCHs, the terminal device may generate two semi-static codebooks. In addition, each semi-static codebook corresponds to one control resource pool (Control-Resource Set, CORESET) index. The terminal device sorts the two semi-static codebooks based on corresponding CORESET indexes, and generates one codebook. After the terminal device reports the generated codebook to the network device, the network device may distinguish between the two semi-static codebooks based on the CORESET indexes, and then determine whether to resend the PDSCH.

However, when time domain resources of two PDSCHs are repeated, and DCI for scheduling the two PDSCHs is located in a same CORESET (that is, has a same CORESET index), CORESET indexes of HARQ-ACK information of the two PDSCHs are the same. The network device cannot distinguish between pieces of the HARQ-ACK information corresponding to each PDSCH based on the CORESET indexes. As a result, the network device cannot determine whether the terminal device normally receives each PDSCH. In this way, the network device may resend a PDSCH normally received by the terminal device, or the network device does not resend a PDSCH abnormally received by the terminal device. As a result, a resource of the network device is wasted, or the terminal device loses data.

In conclusion, it can be learned that in the foregoing conventional technology, when time domain resources of the plurality of PDSCHs are repeated, the network device cannot determine whether the terminal device normally receives each PDSCH.

Therefore, embodiments of this application provide an uplink acknowledgement information transmission method. Before the uplink acknowledgement information transmission method in embodiments of this application is described, a network architecture and a service scenario in embodiments of this application are first described.

The network architecture and the service scenario described in embodiments of this application are intended to describe the technical solutions in embodiments of this application more clearly, and do not constitute any limitation on the technical solutions provided in embodiments of this application. A person of ordinary skill in the art may know that with evolution of the network architecture and emergence of a new service scenario, the technical solutions provided in embodiments of this application are also applicable to similar technical problems.

For ease of understanding embodiments of this application, a communication system shown in FIG. 3 is first used as an example to describe in detail a communication system applicable to embodiments of this application. For example. FIG. 3 is a schematic diagram of an architecture of a communication system to which an uplink acknowledgement information transmission method is applicable according to an embodiment of this application.

As shown in FIG. 3, the communication system includes a network device and a terminal device. For example, the network device includes a core network device 310 and a radio access network device 320, and the terminal device includes a terminal device 330 and a terminal device 340). The terminal device 330 and the terminal device 340 are wirelessly connected to the radio access network device 320, and the radio access network device 320 is wirelessly/wiredly connected to the core network device 310. The core network device 310 and the radio access network device 320 may be independent and different physical devices. Alternatively, a function of the core network device 310 and a logical function of the radio access network device 320 may be integrated into a same physical device. Alternatively, some functions of the core network device 310 and some functions of the radio access network device 320 may be integrated into a physical device.

The network device is a device that is located on a network side of the communication system and has a wireless transceiver function, or a chip or a chip system that may be disposed in the device. The network device includes but is not limited to: an access point (AP) in a wireless fidelity (Wi-Fi) system, such as a home gateway, a router, a server, a switch, and a bridge, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless relay node, a wireless backhaul node, a transmission point (TP, or transmission reception point (TRP)), or the like. Alternatively, the network device may be a gNB or a transmission point (a TRP or a TP) in a 5G system, for example, a new radio (NR) system, or one or one group of (including a plurality of antenna panels) antenna panels of a base station in a 5G system, or may be a network node that constitutes a gNB or a transmission point, such as a baseband unit (BBU), a distributed unit (DU), or a road side unit (RSU) having a base station function.

The terminal device is a terminal that accesses the communication system and has a wireless transceiver function, or a chip or a chip system that may be disposed in the terminal. The terminal device may also be referred to as user equipment, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a pad, a computer having a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid (smart grid), a wireless terminal in transportation safety, a wireless terminal in a smart city, a wireless terminal in a smart home, a vehicle terminal, an RSU having a terminal function, or the like. The terminal device in this application may alternatively be a vehicle-mounted module, a vehicle-mounted component, a vehicle-mounted chip, or a vehicle-mounted unit that is built in a vehicle as one or more components or units. The vehicle may implement the uplink acknowledgement information transmission method provided in this application by using the built-in vehicle-mounted module, the vehicle-mounted component, the vehicle-mounted chip, or the vehicle-mounted unit.

It should be noted that the uplink acknowledgement information transmission method provided in embodiments of this application is applicable between the terminal device and the network device shown in FIG. 3. For specific implementation, refer to the following method embodiments. Details are not described herein again.

It should be noted that the solutions in embodiments of this application may be further applied to another communication system, and a corresponding name may alternatively be replaced with a name of a corresponding function in the another communication system.

It should be understood that FIG. 3 is merely a simplified schematic diagram of an example for ease of understanding. The communication system may further include another network device and/or another terminal device, which is not shown in FIG. 3.

With reference to the accompanying drawings, the following describes in detail the uplink acknowledgement information transmission method provided in embodiments of this application.

For example. FIG. 4 is a schematic flowchart of an uplink acknowledgement information transmission method according to an embodiment of this application. The uplink acknowledgement information transmission method is applicable to communication between the terminal device and the network device shown in FIG. 3. As shown in FIG. 4, the uplink acknowledgement information transmission method includes the following steps.

S401: The terminal device obtains a plurality of first HARQ-ACK codebooks.

Each of the plurality of first HARQ-ACK codebooks includes HARQ-ACK information of at least one downlink data channel. In other words, one first HARQ-ACK codebook includes at least one piece of HARQ-ACK information. For example, the plurality of first HARQ-ACK codebooks include a HARQ-ACK codebook A and a HARQ-ACK codebook B. The HARQ-ACK codebook A includes HARQ-ACK information 0 of a downlink data channel 0, HARQ-ACK information 1 of a downlink data channel 1, and HARQ-ACK information 2 of a downlink data channel 2. The HARQ-ACK codebook B includes HARQ-ACK information 3 of a downlink data channel 3 and HARQ-ACK information 4 of a downlink data channel 4.

It should be noted that the downlink data channel may be a PDSCH, a physical broadcast channel (PBCH), or the like. This is not limited in this embodiment of this application. In this embodiment of this application, an example in which the downlink data channel is the PDSCH is used to describe the method in this embodiment of this application.

In this embodiment of this application, a cyclic redundancy check (CRC) of the downlink data channel is scrambled by using a first radio network temporary identifier (RNTI).

It should be noted that RNTIs of downlink data channels in one HARQ-ACK codebook are the same. RNTIs of downlink data channels in different HARQ-ACK codebooks are different. That is, each first HARQ-ACK codebook corresponds to one first radio network temporary identifier RNTI. In addition, first RNTIs corresponding to the first HARQ-ACK codebooks are different. For example, the HARQ-ACK codebook A includes HARQ-ACK information 0 of a PDSCH0, HARQ-ACK information 1 of a PDSCH1, and HARQ-ACK information 2 of a PDSCH2. If RNTI values of the PDSCH0, the PDSCH1, and the PDSCH2 are 003D, a value of an RNTI corresponding to the HARQ-ACK codebook A is 003D. The HARQ-ACK codebook B includes HARQ-ACK information 3 of a PDSCH3 and HARQ-ACK information 4 of a PDSCH4. If RNTI values of the PDSCH3 and the PDSCH4 are F111, an RNTI corresponding to the HARQ-ACK codebook B is F111.

In a possible implementation, the terminal device may generate the plurality of first HARQ-ACK codebooks in a target uplink slot, and the target uplink slot is a slot in which the plurality of first HARQ-ACK codebooks are transmitted.

The plurality of first HARQ-ACK codebooks may be configured based on a same K1 table, or may be configured based on different K1 tables. This is not limited in this embodiment of this application. The K1 table indicates a slot interval between a slot in which downlink transmission on which a HARQ-ACK feedback needs to be performed is located and the target uplink slot.

S402: The terminal device sends a physical uplink channel to the network device.

The physical uplink channel may be a PUCCH or a PUSCH. The physical uplink channel carries a second HARQ-ACK codebook. The second HARQ-ACK codebook includes at least one of the plurality of first HARQ-ACK codebooks that are concatenated in a preset order. In other words, the second HARQ-ACK codebook may include the plurality of first HARQ-ACK codebooks, or may include some of the plurality of first HARQ-ACK codebooks.

In this embodiment of this application, the preset order is determined based on a plurality of first RNTIs corresponding to the plurality of first HARQ-ACK codebooks. The first RNTI includes a cell radio network temporary identifier (C-RNTI) and/or a group radio network temporary identifier (G-RNTI).

It should be noted that a HARQ-ACK codebook corresponding to the C-RNTI is a unicast codebook, and a HARQ-ACK codebook corresponding to the G-RNTI is a multicast codebook, or a broadcast codebook. In this embodiment of this application, an example in which the HARQ-ACK codebook corresponding to the G-RNTI is the multicast codebook is used to describe the method in this embodiment of this application.

In some embodiments, the plurality of first HARQ-ACK codebooks may include one unicast codebook and one multicast codebook. The preset order may be that a first HARQ-ACK codebook corresponding to the C-RNTI is before a first HARQ-ACK codebook corresponding to the G-RNTI, that is, the unicast codebook is before the multicast codebook. Alternatively, the preset order may be that a first HARQ-ACK codebook corresponding to the C-RNTI is after a first HARQ-ACK codebook corresponding to the G-RNTI, that is, the unicast codebook is after the multicast codebook.

In some other embodiments, the plurality of first HARQ-ACK codebooks may include a plurality of multicast codebooks. The preset order may be that first HARQ-ACK codebooks corresponding to a plurality of G-RNTIs are arranged in descending order of the G-RNTIs corresponding to the first HARQ-ACK codebooks. In other words, the plurality of multicast codebooks are arranged in descending order of G-RNTIs corresponding to the multicast codebooks. Alternatively, first HARQ-ACK codebooks corresponding to a plurality of G-RNTIs are arranged in ascending order of the G-RNTIs corresponding to the first HARQ-ACK codebooks. In other words, the plurality of multicast codebooks are arranged in ascending order of G-RNTIs corresponding to the multicast codebooks.

In some other embodiments, the plurality of first HARQ-ACK codebooks may include one unicast codebook and a plurality of multicast codebooks. In this case, the preset order may be that a first HARQ-ACK codebook corresponding to the C-RNTI is before a first HARQ-ACK codebook corresponding to the G-RNTI (or a first HARQ-ACK codebook corresponding to the C-RNTI is after a first HARQ-ACK codebook corresponding to the G-RNTI), and first HARQ-ACK codebooks corresponding to a plurality of G-RNTIs are arranged in descending order of the G-RNTIs corresponding to the first HARQ-ACK codebooks. Alternatively, the preset order may be that a first HARQ-ACK codebook corresponding to the C-RNTI is before a first HARQ-ACK codebook corresponding to the G-RNTI (or a first HARQ-ACK codebook corresponding to the C-RNTI is after a first HARQ-ACK codebook corresponding to the G-RNTI), and first HARQ-ACK codebooks corresponding to a plurality of G-RNTIs are arranged in ascending order of the G-RNTIs corresponding to the first HARQ-ACK codebooks. Alternatively, the preset order may be that a first HARQ-ACK codebook corresponding to the C-RNTI and first HARQ-ACK codebooks corresponding to a plurality of G-RNTIs are arranged in descending order of the RNTIs corresponding to the first HARQ-ACK codebooks. In other words, the unicast codebook and the multicast codebook are arranged in descending order of RNTIs corresponding to the codebooks. Alternatively, a first HARQ-ACK codebook corresponding to the C-RNTI and first HARQ-ACK codebooks corresponding to a plurality of G-RNTIs are arranged in ascending order of the RNTIs corresponding to the first HARQ-ACK codebooks. In other words, the unicast codebook and the multicast codebook are arranged in ascending order of RNTIs corresponding to the codebooks.

For example, the plurality of first HARQ-ACK codebooks include a unicast codebook a, a multicast codebook a, and a multicast codebook b. An RNTI corresponding to the unicast codebook a is 003D, a value of an RNTI corresponding to the multicast codebook a is 0041, and a value of an RNTI corresponding to the multicast codebook b is 0051. If the preset order is that the first HARQ-ACK codebook corresponding to the C-RNTI is before the first HARQ-ACK codebook corresponding to the G-RNTI, and the first HARQ-ACK codebooks corresponding to the plurality of G-RNTIs are arranged in descending order of the G-RNTIs corresponding to the first HARQ-ACK codebooks, as shown in FIG. 5, the unicast codebook a is in the front, the multicast codebook b is between the unicast codebook a and the multicast codebook a, and the multicast codebook a is in the end. Each bit (Binary digit, bit) corresponds to one piece of HARQ-ACK information.

S403: The network device receives the physical uplink channel from the terminal device.

Based on the foregoing technical solution, after the terminal device obtains the plurality of first HARQ-ACK codebooks, the terminal device may send the physical uplink channel carrying the second HARQ-ACK codebook, where the second HARQ-ACK codebook includes the at least one first HARQ-ACK codebook that is concatenated in the preset order. In other words, the physical uplink channel sent by the terminal device carries a plurality of first HARQ-ACK codebooks. In this way, the terminal device may report the plurality of HARQ-ACK codebooks by using one resource, so that resources consumed when the plurality of HARQ-ACK codebooks are reported are reduced, thereby improving resource utilization.

In addition, the preset order is determined based on the plurality of first RNTIs corresponding to the plurality of first HARQ-ACK codebooks, and each first HARQ-ACK codebook corresponds to one first RNTI, and the first RNTIs corresponding to the first HARQ-ACK codebooks are different. In this way, after the terminal device sends the physical uplink channel carrying the second HARQ-ACK codebook, the network device may distinguish between the plurality of first HARQ-ACK codebooks based on different first RNTIs, and then determine whether to resend the downlink data channel. Therefore, in this solution, it can be avoided that the network device resends a downlink data channel normally received by the terminal device, or the network device does not resend a downlink data channel abnormally received by the terminal device, so that communication quality and resource utilization are improved.

It should be noted that the plurality of first HARQ-ACK codebooks may be configured based on a same SLIV, or may be configured based on different SLIVs. This is not limited in this embodiment of this application. The SLIV represents a start index of a time domain symbol occupied by the downlink data channel and a length of the occupied time domain symbol, where the SLIV is an integer, and $0 \leq SLIV \leq 127$. For example, that the SLIV is 1 may indicate that the start index of the time domain symbol occupied by the PDSCH is 2, and the length of the occupied time domain symbol is 5.

The terminal device may obtain, based on the SLIV and a preset formula, the start index of the time domain symbol occupied by the downlink data channel and the length of the occupied time domain symbol. If there is no intersection between time domain symbols occupied by different downlink data channels, there is no intersection between time domain resources of the different downlink data channels. If different downlink data channels are in a same slot, and there is an intersection between occupied time domain symbols, there is an intersection between time domain resources of the different downlink data channels. For example, as shown in FIG. 6, a start index of a time domain symbol occupied by a downlink data channel a is 5, and a length of the occupied time domain symbol is 6. A start index of a time domain symbol occupied by a downlink data channel b is 3, and a length of the occupied time domain symbol is 5. There is an intersection between time domain resources of the downlink data channel a and the downlink data channel b.

It should be noted that, for a plurality of downlink data channels whose time domain resources have an intersection, the plurality of downlink data channels may correspond to one piece of HARQ-ACK information. In this way, the network device may resend a PDSCH normally received by the terminal device, or the network device does not resend a PDSCH abnormally received by the terminal device. As a result, a resource of the network device is wasted, or the terminal device loses data.

In this embodiment of this application, in the plurality of first HARQ-ACK codebooks, there may be an intersection between time domain resources occupied by downlink data channels corresponding to different codebooks. For example, the plurality of first HARQ-ACK codebooks include a third HARQ-ACK codebook and a fourth HARQ-ACK codebook. The third HARQ-ACK codebook includes HARQ-ACK information of at least one first downlink data channel, and the fourth HARQ-ACK codebook includes HARQ-ACK information of at least one second downlink data channel. There is an intersection between time domain resources occupied by the at least one first downlink data channel and the at least one second downlink data channel. To be specific, the first downlink data channel and the second downlink data channel may correspond to one piece of HARQ-ACK information.

Figure 7A:
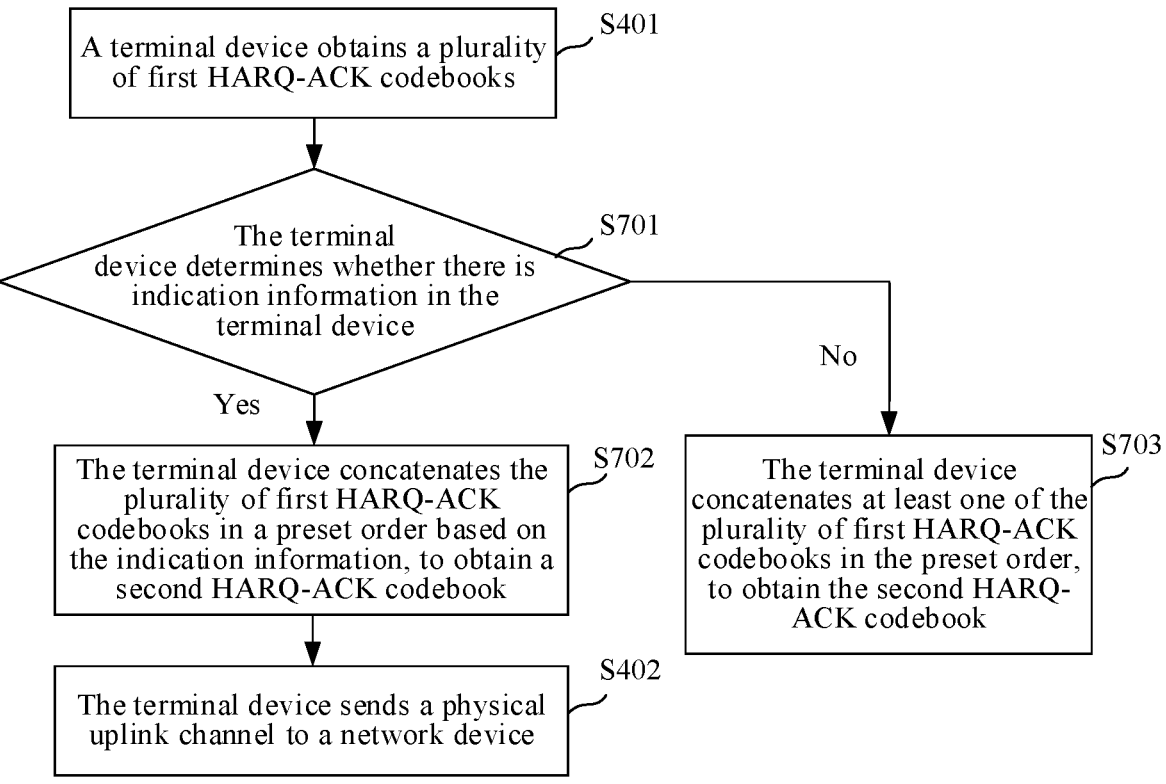
FIG. 7A is a schematic flowchart of another uplink acknowledgement information transmission method according to an embodiment of this application.

Therefore, in some embodiments, the terminal device may determine whether there is indication information in the terminal device, to perform different concatenation on the plurality of first HARQ-ACK codebooks. The indication information indicates the terminal device to concatenate the at least one of the plurality of first HARQ-ACK codebooks in the preset order. FIG. 7A is a schematic flowchart of an uplink acknowledgement information transmission method according to an embodiment of this application. As shown in FIG. 7A, the uplink acknowledgement information transmission method includes the following steps.

S701: A terminal device determines whether there is indication information in the terminal device.

The indication information indicates the terminal device to concatenate at least one of a plurality of first HARQ-ACK codebooks in a preset order. The indication information may be 1 bit or 2 bits. A quantity of bits of the indication information is not limited in this embodiment of this application.

It should be noted that if there is the indication information in the terminal device, frequency division multiplexing can be performed between different downlink data channels. For example, frequency division multiplexing can be performed between a PDSCH carrying broadcast data and a PDSCH carrying multicast data. For another example, frequency division multiplexing can be performed between different PDSCHs carrying multicast data. If there is no indication information in the terminal device, frequency division multiplexing cannot be performed between different downlink data channels.

It may be understood that the terminal device may perform different concatenation manners on the plurality of first HARQ-ACK codebooks by determining whether there is the indication information in the terminal device, that is, whether frequency division multiplexing can be performed between different downlink data channels.

In a possible design, if there is the indication information in the terminal device, the terminal device performs S702. If there is no indication information in the terminal device, the terminal device performs S703.

It should be noted that a sequence in which the terminal device performs S701 and S401 is not limited in this embodiment of this application. In other words, the terminal device may first perform S701, and then perform S401. Alternatively, the terminal device may first perform S401, and then perform S701. Alternatively, the terminal device may perform S401 and S701 at the same time.

S702: The terminal device concatenates the plurality of first HARQ-ACK codebooks in the preset order based on the indication information, to obtain a second HARQ-ACK codebook.

It should be noted that if there is the indication information in the terminal device, frequency division multiplexing can be performed between a plurality of downlink data channels. In this way, even if there is an intersection between time domain resources occupied by downlink data channels corresponding to HARQ-ACK information in different HARQ-ACK codebooks, each downlink data channel whose occupied time domain resource has the intersection may still correspond to one piece of HARQ-ACK information.

For example, a third HARQ-ACK codebook is a unicast codebook a, and a fourth HARQ-ACK codebook is a multicast codebook b. The unicast codebook a includes five PDSCH receiving occasions, which are respectively a receiving occasion #0, a receiving occasion #1, a receiving occasion #2, a receiving occasion #3, and a receiving occasion #4. The multicast codebook b includes five PDSCH receiving occasions, which are respectively a receiving occasion #10, a receiving occasion #11, a receiving occasion #12, a receiving occasion #13, and a receiving occasion #14.

Figures 7B, 8:
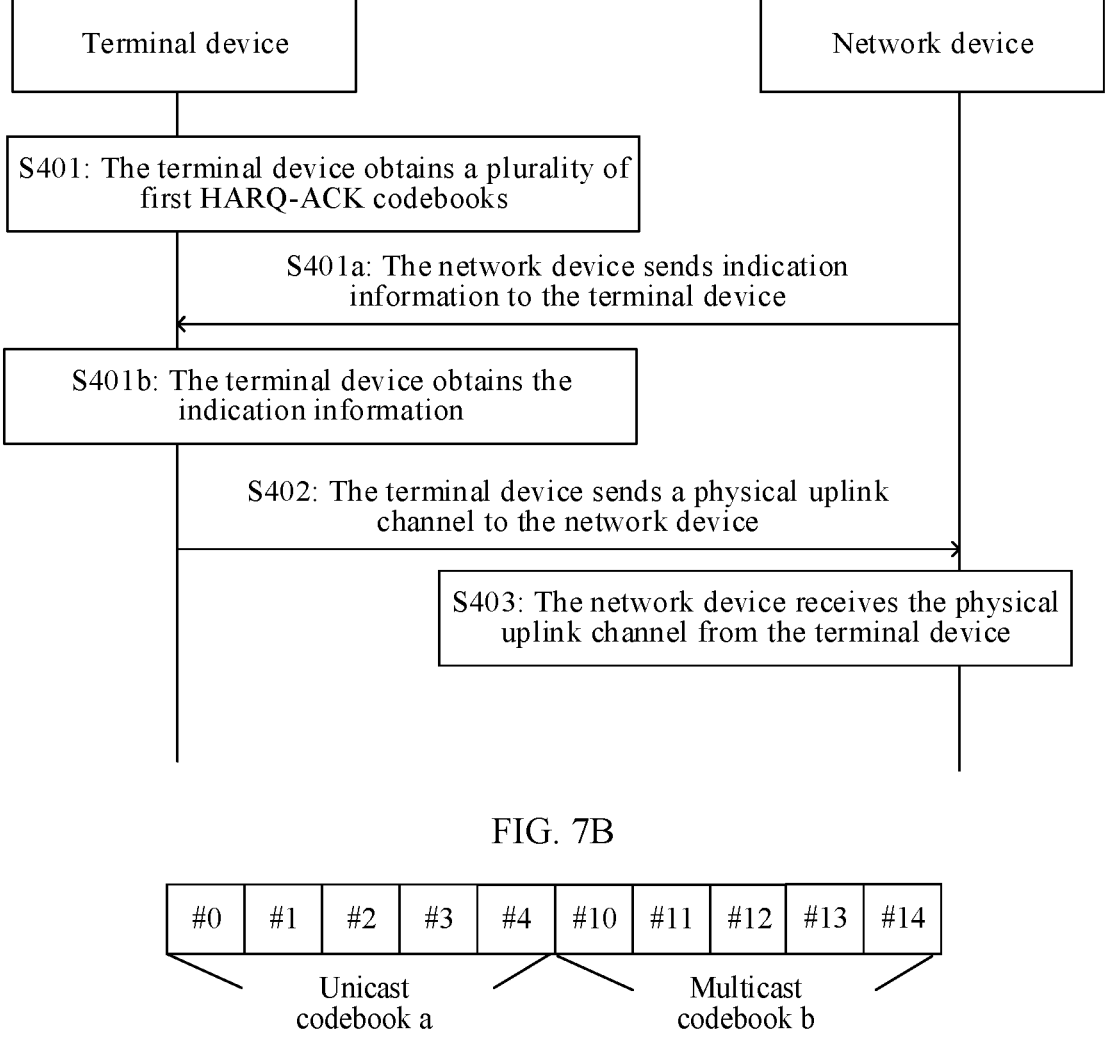
FIG. 7B is a schematic flowchart of another uplink acknowledgement information transmission method according to an embodiment of this application.
FIG. 8 is a schematic diagram of an example of another concatenation of HARQ-ACK codebooks according to an embodiment of this application.

It is assumed that slot indexes corresponding to the receiving occasion #2 of the unicast codebook a and the receiving occasion #12 of the multicast codebook b are the same, there is an intersection between time domain resources corresponding to SLIVs, and there is the indication information in the terminal device. To be specific, there is an intersection between time domain resources occupied by a PDSCH corresponding to the receiving occasion #2 of the unicast codebook a and a PDSCH corresponding to the receiving occasion #12 of the multicast codebook b. As shown in FIG. 8, the terminal device may concatenate the unicast codebook a and the multicast codebook b in the preset order (for example, an order in which the unicast codebook is before the multicast codebook).

It may be understood that if there is the indication information in the terminal device, the terminal device may transmit a complete HARQ-ACK codebook to a network device. In this way, the network device may determine the HARQ-ACK information corresponding to each downlink data channel based on the HARQ-ACK codebook, and then determine whether to resend the downlink data channel. Therefore, in this embodiment of this application, it can be avoided that the network device resends a downlink data channel normally received by the terminal device, or the network device does not resend a downlink data channel abnormally received by the terminal device, so that resource waste is reduced and communication quality is improved.

In some embodiments, the terminal device may obtain the indication information before sending a physical uplink channel to the network device. As shown in FIG. 7B, before S402, the uplink acknowledgement information transmission method includes the following steps.

S401a: The network device sends indication information to the terminal device.

That the network device sends indication information to the terminal device includes the following manner (a) and manner (b).

In the manner (a), the network device sends higher layer signaling to the terminal device, where the higher layer signaling includes the indication information.

In the manner (b), the network device sends DCI to the terminal device, where the DCI includes the indication information.

S401b: The terminal device obtains the indication information.

That the terminal device obtains the indication information includes the following three manners.

In the manner 1, the terminal device receives the higher layer signaling, where the higher layer signaling includes the indication information.

In the manner 2, the terminal device receives the DCI, where the DCI includes the indication information. The indication information is obtained by using the DCI, so that a manner of concatenating the plurality of first HARQ-ACK codebooks can be dynamically indicated. This makes the concatenation manner more flexible.

In the manner 3, the terminal device obtains capability information of the terminal device, where the capability information indicates whether the terminal device supports frequency division multiplexing, and the capability information includes the indication information.

In conclusion, the terminal device may obtain the indication information in a plurality of manners, so that the terminal device obtains the indication information in a more flexible manner.

In some embodiments, the terminal device may further send the capability information to the network device. The network device may obtain the capability information from the terminal device.

S703: The terminal device concatenates the at least one of the plurality of first HARQ-ACK codebooks in the preset order, to obtain the second HARQ-ACK codebook.

It should be noted that if there is no indication information in the terminal device, frequency division multiplexing cannot be performed between the plurality of downlink data channels. In this way, there is the intersection between the time domain resources occupied by the downlink data channels corresponding to the HARQ-ACK information in the different HARQ-ACK codebooks, and a plurality of downlink data channels whose occupied time domain resources have the intersection may correspond to one piece of HARQ-ACK information.

In a possible implementation, the terminal device removes HARQ-ACK information of at least one first downlink data channel from the third HARQ-ACK codebook, and concatenates a processed third HARQ-ACK codebook and a first HARQ-ACK codebook other than the third HARQ-ACK codebook in the plurality of first HARQ-ACK codebooks in the preset order, to obtain the second HARQ-ACK codebook.

Figures 9A, 9B:
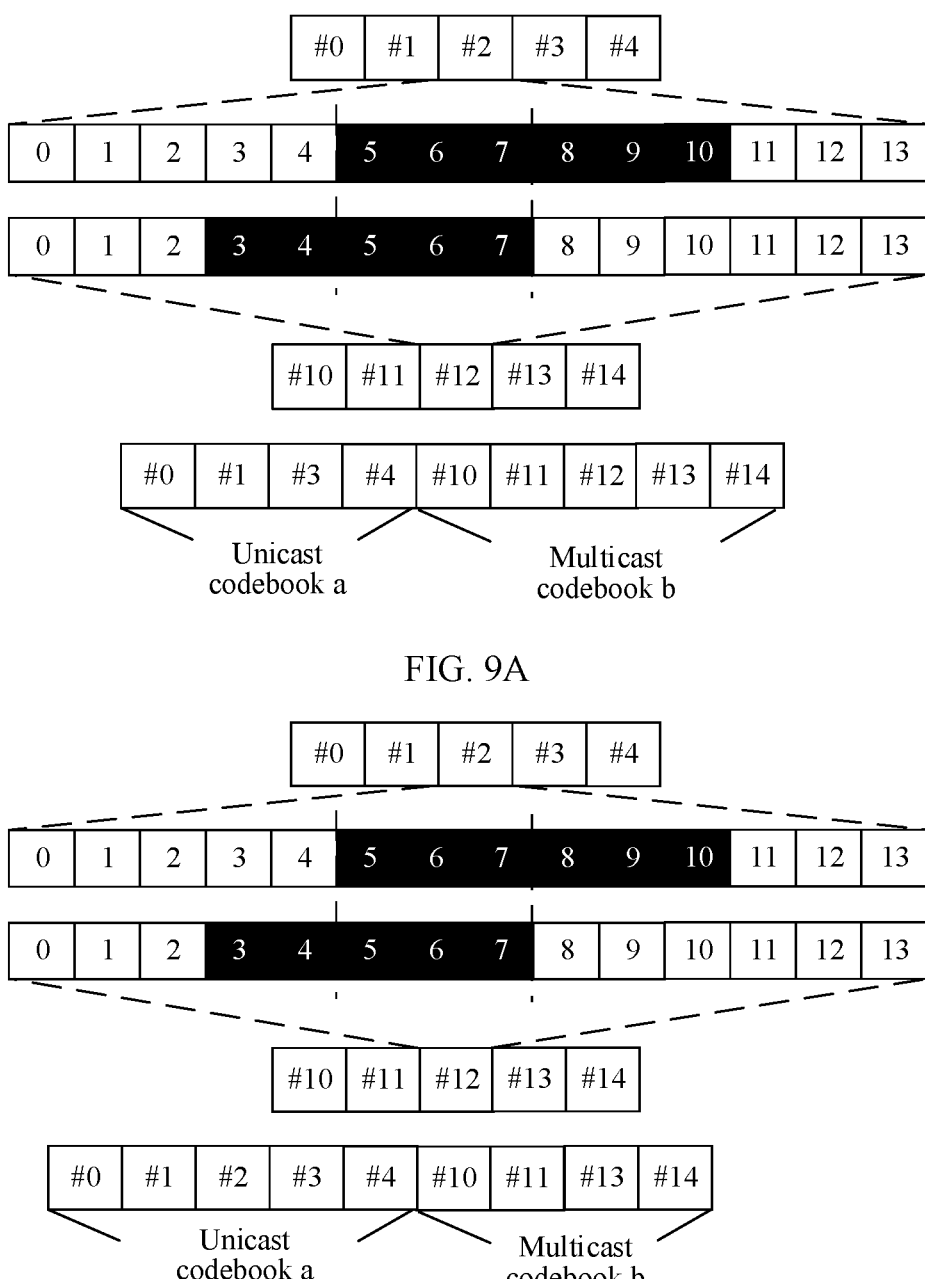
FIG. 9A is a schematic diagram of an example of another concatenation of HARQ-ACK codebooks according to an embodiment of this application.
FIG. 9B is a schematic diagram of an example of another concatenation of HARQ-ACK codebooks according to an embodiment of this application.

For example, the third HARQ-ACK codebook is the unicast codebook a, and the fourth HARQ-ACK codebook is the multicast codebook b. The unicast codebook a includes the five PDSCH receiving occasions, which are respectively the receiving occasion #0, the receiving occasion #1, the receiving occasion #2, the receiving occasion #3, and the receiving occasion #4. The multicast codebook b includes the five PDSCH receiving occasions, which are respectively the receiving occasion #10, the receiving occasion #11, the receiving occasion #12, the receiving occasion #13, and the receiving occasion #14. It is assumed that there is no indication information in the terminal device, the slot indexes corresponding to the receiving occasion #2 of the unicast codebook a and the receiving occasion #12 of the multicast codebook b are the same, and there is the intersection between the time domain resources corresponding to the SLIVs. To be specific, there is the intersection between the time domain resources occupied by the PDSCH corresponding to the receiving occasion #2 of the unicast codebook a and the PDSCH corresponding to the receiving occasion #12 of the multicast codebook b. As shown in FIG. 9A, the terminal device may remove HARQ-ACK information of the PDSCH corresponding to the receiving occasion #2 of the unicast codebook a from the unicast codebook a, and then concatenate a processed unicast codebook a and multicast codebook b in the preset order (for example, the order in which the unicast codebook is before the multicast codebook).

In conclusion, it can be learned that the terminal device may remove, from a codebook that ranks in top. PDSCH receiving occasions (namely, corresponding HARQ-ACK information) whose time domain resources have an intersection. In this way, a quantity of bits reported to the network device can be reduced, thereby reducing air interface resource overheads.

In another possible implementation, the terminal device removes HARQ-ACK information of at least one second downlink data channel from the fourth HARQ-ACK codebook, and concatenates a processed fourth HARQ-ACK codebook and a first HARQ-ACK codebook other than the fourth HARQ-ACK codebook in the plurality of first HARQ-ACK codebooks in the preset order, to obtain the second HARQ-ACK codebook.

For example, the third HARQ-ACK codebook is the unicast codebook a, and the fourth HARQ-ACK codebook is the multicast codebook b. The unicast codebook a includes the five PDSCH receiving occasions, which are respectively the receiving occasion #0, the receiving occasion #1, the receiving occasion #2, the receiving occasion #3, and the receiving occasion #4. The multicast codebook b includes the five PDSCH receiving occasions, which are respectively the receiving occasion #10, the receiving occasion #11, the receiving occasion #12, the receiving occasion #13, and the receiving occasion #14. It is assumed that there is no indication information in the terminal device, the slot indexes corresponding to the receiving occasion #2 of the unicast codebook a and the receiving occasion #12 of the multicast codebook b are the same, and there is the intersection between the time domain resources corresponding to the SLIVs. To be specific, there is the intersection between the time domain resources occupied by the PDSCH corresponding to the receiving occasion #2 of the unicast codebook a and the PDSCH corresponding to the receiving occasion #12 of the multicast codebook b. As shown in FIG. 9B, the terminal device may remove HARQ-ACK information of the PDSCH corresponding to the receiving occasion #12 of the multicast codebook b from the multicast codebook b, and then concatenate a processed multicast codebook b and unicast codebook a in the preset order (for example, the order in which the unicast codebook is before the multicast codebook).

In conclusion, it can be learned that the terminal device may remove, from a codebook that ranks behind. PDSCH receiving occasions (namely, corresponding HARQ-ACK information) whose time domain resources have an intersection. In this way, a quantity of bits reported to the network device can be reduced, thereby reducing air interface resource overheads.

It should be noted that the reserved HARQ-ACK information is not limited in this embodiment of this application. To be specific, the HARQ-ACK information corresponding to the PDSCH whose time domain resource has the intersection may be an ACK or a NACK. However, usually, if the HARQ-ACK information corresponding to the PDSCH whose time domain resource has the intersection includes the NACK, the NACK may be preferentially reserved, and a receiving occasion of a PDSCH whose time domain resource has an intersection in another codebook is removed. In this way, it can be ensured that the terminal device can report that the received downlink data channel is in an abnormal state, so that the network device resends the downlink data channel that is abnormally received by the terminal device, to improve communication quality.

Based on the foregoing technical solution, the terminal device may determine whether there is the indication information in the terminal device. The indication information indicates the terminal device to concatenate the at least one of the plurality of first HARQ-ACK codebooks in the preset order. In this way, in this embodiment of this application, the terminal device may perform different concatenation manners on the plurality of first HARQ-ACK codebooks depending on whether there is the indication information in the terminal device.

In some other embodiments, after obtaining the indication information, the terminal device may concatenate the at least one of the plurality of first HARQ-ACK codebooks in the preset order based on the indication information, to obtain the second HARQ-ACK codebook. The indication information includes a first value or a second value. The first value and the second value may be any two different values. For example, the first value may be 1, and the second value may be 0.

In a possible implementation, after obtaining the indication information, the terminal device determines whether a value included in the indication information is the first value.

In a possible design, when the indication information includes the first value, the terminal device may concatenate the plurality of first HARQ-ACK codebooks in the preset order, to obtain the second HARQ-ACK codebook. For example, when the indication information includes the first value, frequency division multiplexing can be performed between different downlink data channels, and the terminal device may concatenate the plurality of first HARQ-ACK codebooks in the preset order, to obtain the second HARQ-ACK codebook. For a description of a process in which the terminal device may concatenate the plurality of first HARQ-ACK codebooks in the preset order to obtain the second HARQ-ACK codebook, refer to the foregoing descriptions of S702. Details are not described herein again.

When the indication information includes the second value, the terminal device may concatenate the at least one of the plurality of first HARQ-ACK codebooks in the preset order, to obtain the second HARQ-ACK codebook. For a description of a process in which the terminal device may concatenate the at least one of the plurality of first HARQ-ACK codebooks in the preset order to obtain the second HARQ-ACK codebook, refer to the foregoing descriptions of S703. Details are not described herein again.

In conclusion, it can be learned that different indication information corresponds to different manners of concatenating the plurality of first HARQ-ACK codebooks. In this way, the terminal device may perform different concatenation manners on the plurality of first HARQ-ACK codebooks based on different indication information.

The foregoing describes in detail the uplink acknowledgement information transmission method provided in embodiments of this application with reference to FIG. 4 to FIG. 9B. The following describes in detail communication apparatuses provided in embodiments of this application with reference to FIG. 10 to FIG. 12.

Figure 10:
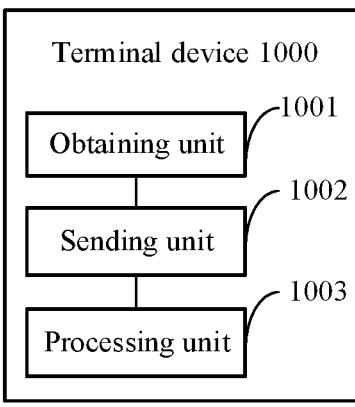
FIG. 10 is a schematic diagram of a structure of a terminal device according to an embodiment of this application.

For example, FIG. 10 is a schematic diagram of a structure of a terminal device according to an embodiment of this application. As shown in FIG. 10, the terminal device 1000 includes an obtaining unit 1001, a sending unit 1002, and a processing unit 1003. For ease of description. FIG. 10 shows only main components of the terminal device.

In a possible design scheme, the terminal device 1000 is applicable to the communication system shown in FIG. 3, and performs a function of sending uplink acknowledgement information in the uplink acknowledgement information transmission method shown in FIG. 4 to FIG. 9B.

The obtaining unit 1001 is configured to obtain a plurality of first HARQ-ACK codebooks, where each of the plurality of first HARQ-ACK codebooks includes HARQ-ACK information of at least one downlink data channel, each first HARQ-ACK codebook corresponds to one first radio network temporary identifier RNTI, and the first RNTIs corresponding to the first HARQ-ACK codebooks are different. The sending unit 1002 is configured to send a physical uplink channel to a network device, where the physical uplink channel carries a second HARQ-ACK codebook, the second HARQ-ACK codebook includes at least one of the plurality of first HARQ-ACK codebooks that are concatenated in a preset order, and the preset order is determined based on a plurality of first RNTIs corresponding to the plurality of first HARQ-ACK codebooks.

Optionally, the plurality of first HARQ-ACK codebooks include a third HARQ-ACK codebook and a fourth HARQ-ACK codebook. The third HARQ-ACK codebook includes HARQ-ACK information of at least one first downlink data channel, and the fourth HARQ-ACK codebook includes HARQ-ACK information of at least one second downlink data channel. There is an intersection between time domain resources occupied by the at least one first downlink data channel and the at least one second downlink data channel.

Optionally, the obtaining unit 1001 is further configured to obtain indication information, where the indication information indicates to concatenate the at least one of the plurality of first HARQ-ACK codebooks in the preset order. The processing unit 1003 is configured to concatenate the at least one of the plurality of first HARQ-ACK codebooks in the preset order based on the indication information, to obtain the second HARQ-ACK codebook.

Optionally, the indication information includes a first value or a second value. The processing unit 1003 is further configured to: if the indication information includes the first value, concatenate the plurality of first HARQ-ACK codebooks in the preset order, to obtain the second HARQ-ACK codebook.

Optionally, the processing unit 1003 is further configured to: if the indication information includes the second value, remove the HARQ-ACK information of the at least one first downlink data channel from the third HARQ-ACK codebook, and concatenate a processed third HARQ-ACK codebook and a first HARQ-ACK codebook other than the third HARQ-ACK codebook in the plurality of first HARQ-ACK codebooks in the preset order, to obtain the second HARQ-ACK codebook; or if the indication information includes the second value, remove the HARQ-ACK information of the at least one second downlink data channel from the fourth HARQ-ACK codebook, and concatenate a processed fourth HARQ-ACK codebook and a first HARQ-ACK codebook other than the fourth HARQ-ACK codebook in the plurality of first HARQ-ACK codebooks in the preset order, to obtain the second HARQ-ACK codebook.

Optionally, the obtaining unit 1001 is specifically configured to: receive higher layer signaling, where the higher layer signaling includes the indication information: receive downlink control information DCI, where the DCI includes the indication information; or obtain capability information of the terminal device, where the capability information indicates whether the terminal device supports frequency division multiplexing, and the capability information includes the indication information.

Optionally, the preset order includes: arranging in descending order of the RNTIs corresponding to the first HARQ-ACK codebooks; or arranging in ascending order of the RNTIs corresponding to the first HARQ-ACK codebooks.

Optionally, the first RNTI includes a cell radio network temporary identifier C-RNTI and/or a group radio network temporary identifier G-RNTI. The preset order includes: A first HARQ-ACK codebook corresponding to the C-RNTI is before a first HARQ-ACK codebook corresponding to the G-RNTI; or a first HARQ-ACK codebook corresponding to the C-RNTI is after a first HARQ-ACK codebook corresponding to the G-RNTI.

Optionally, the first RNTI includes the cell radio network temporary identifier C-RNTI and/or the group radio network temporary identifier G-RNTI. The preset order includes: First HARQ-ACK codebooks corresponding to a plurality of G-RNTIs are arranged in descending order of the G-RNTIs corresponding to the first HARQ-ACK codebooks; or first HARQ-ACK codebooks corresponding to a plurality of G-RNTIs are arranged in ascending order of the G-RNTIs corresponding to the first HARQ-ACK codebooks.

Optionally, the terminal device 1000 shown in FIG. 10 may further include a storage module (not shown in FIG. 10), and the storage module stores a program or instructions. When the sending unit 1002 executes the program or the instructions, the terminal device 1000 is enabled to perform the function of sending the uplink acknowledgement information in the uplink acknowledgement information transmission method shown in FIG. 5.

It should be noted that the terminal device 1000 may be any terminal device shown in FIG. 3, or may be a chip (system) or another component or assembly disposed in the terminal device. This is not limited in this embodiment of this application.

In addition, for a technical effect of the terminal device 1000, refer to a technical effect of the uplink acknowledgement information transmission method shown in FIG. 4 to FIG. 9B. Details are not described herein again.

Figure 11:
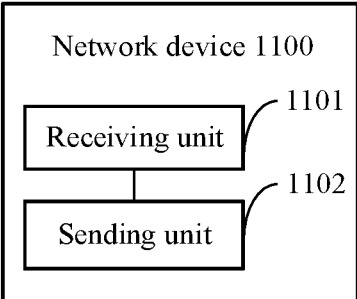
FIG. 11 is a schematic diagram of a structure of a network device according to an embodiment of this application.

For example, FIG. 11 is a schematic diagram of a structure of a network device according to an embodiment of this application. As shown in FIG. 11, the network device 1100 includes a receiving unit 1101 and a sending unit 1102. For ease of description, FIG. 11 shows only main components of the network device.

In a possible design scheme, the network device 1100 is applicable to the communication system shown in FIG. 3, and performs a function of sending uplink acknowledgement information in the uplink acknowledgement information transmission method shown in FIG. 4 to FIG. 9B.

The receiving unit 1101 is configured to obtain a physical uplink channel from a terminal device, where the physical uplink channel carries a second HARQ-ACK codebook, the second HARQ-ACK codebook includes at least one of a plurality of first HARQ-ACK codebooks that are concatenated in a preset order, and the preset order is determined based on a plurality of first RNTIs corresponding to the plurality of first HARQ-ACK codebooks.

Optionally, the plurality of first HARQ-ACK codebooks include a third HARQ-ACK codebook and a fourth HARQ-ACK codebook. The third HARQ-ACK codebook includes HARQ-ACK information of at least one first downlink data channel, and the fourth HARQ-ACK codebook includes HARQ-ACK information of at least one second downlink data channel. There is an intersection between time domain resources occupied by the at least one first downlink data channel and the at least one second downlink data channel.

Optionally, the sending unit 1102 is configured to send indication information to the terminal device, where the indication information indicates the terminal device to concatenate the at least one of the plurality of first HARQ-ACK codebooks in the preset order.

Optionally, the sending unit 1102 is specifically configured to: send higher layer signaling to the terminal device, where the higher layer signaling includes the indication information; or send downlink control information DCI to the terminal device, where the DCI includes the indication information.

Optionally, the receiving unit 1101 is further configured to obtain capability information of the terminal device, where the capability information indicates whether the terminal device supports frequency division multiplexing, and the capability information includes the indication information.

Optionally, the network device 1100 shown in FIG. 11 may further include a storage module (not shown in FIG. 11), and the storage module stores a program or instructions. When the sending unit 1102 executes the program or the instructions, the network device 1100 is enabled to perform the function of sending the uplink acknowledgement information in the uplink acknowledgement information transmission method shown in FIG. 5.

It should be noted that the network device 1100 may be any network device shown in FIG. 3, or may be a chip (system) or another component or assembly disposed in the network device. This is not limited in this embodiment of this application.

In addition, for a technical effect of the network device 1100, refer to a technical effect of the uplink acknowledgement information transmission method shown in FIG. 4 to FIG. 9B. Details are not described herein again.

Figure 12:
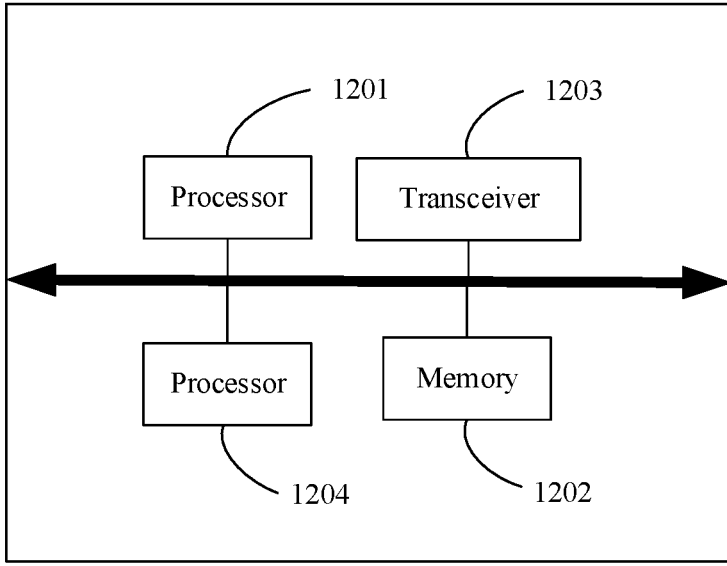
FIG. 12 is a schematic diagram of a structure of an uplink acknowledgement information transmission apparatus according to an embodiment of this application.

For example, FIG. 12 is a schematic diagram of a structure of an uplink acknowledgement information transmission apparatus according to an embodiment of this application. The uplink acknowledgement information transmission apparatus may be a terminal device or a network device, or a chip (system) or another component or assembly disposed in the terminal device or the network device. As shown in FIG. 12, the uplink acknowledgement information transmission apparatus 1200 may include a processor 1201. Optionally, the uplink acknowledgement information transmission apparatus 1200 may further include a memory 1202 and/or a transceiver 1203. The processor 1201 is coupled to the memory 1202 and the transceiver 1203, for example, may be connected through a communication bus.

The following specifically describes components of the uplink acknowledgement information transmission apparatus 1200 with reference to FIG. 12.

The processor 1201 is a control center of a network device, and may be a processor, or may be a collective term of a plurality of processing elements. For example, the processor 1201 may be one or more central processing units (CPUs), may be an application-specific integrated circuit (ASIC), or may be configured as one or more integrated circuits implementing this embodiment of this application, for example, one or more microprocessors (DSP) or one or more field programmable gate arrays (FPGAs).

Optionally, the processor 1201 may perform various functions of the network device by running or executing a software program stored in the memory 1202, and by invoking data stored in the memory 1202.

In specific implementation, in an embodiment, the network device may alternatively include a plurality of processors, for example, the processor 1201 and a processor 1204 shown in FIG. 12. Each of the processors may be a single-core (single-CPU) processor or a multi-core (multi-CPU) processor. The processor herein may be one or more communication devices, circuits, and/or processing cores configured to process data (for example, computer program instructions).

The memory 1202 is configured to store the software program for performing the solutions in this application, and the processor 1201 controls execution. For a specific implementation, refer to the foregoing method embodiments. Details are not described herein again.

Optionally, the memory 1202 may be a read-only memory (ROM) or another type of static storage device that can store static information and instructions, or a random access memory (RAM) or another type of dynamic storage device that can store information and instructions, or may be an electrically erasable programmable read-only memory (EE- PROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage communication device, or any other medium that can be used to carry or store expected program code in a form of an instruction or a data structure and that can be accessed by a computer, but is not limited thereto. The memory 1202 may be integrated with the processor 1201, or may exist independently, and is coupled to the processor 1201 through an input/output port (not shown in FIG. 12) of the network device. This is not specifically limited in this embodiment of this application.

The transceiver 1203 is configured to communicate with another network device. For example, the network device is the terminal device, and the transceiver 1203 may be configured to communicate with a network device or communicate with another terminal device. For another example, the network device is the network device, and the transceiver 1203 may be configured to communicate with a terminal device or communicate with another network device.

Optionally, the transceiver 1203 may include a receiver and a transmitter (not separately shown in FIG. 12). The receiver is configured to implement a receiving function, and the transmitter is configured to implement a sending function.

Optionally, the transceiver 1203 may be integrated with the processor 1201, or may exist independently, and is coupled to the processor 1201 through the input/output port (not shown in FIG. 12) of the network device. This is not specifically limited in this embodiment of this application.

It should be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory in embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. Through an example rather than a limitative description, random access memories (RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by software, hardware (for example, a circuit), firmware, or any combination thereof. When the software is used to implement embodiments, all or some of the foregoing embodiments may be implemented in a form of a computer program product. The computer program product includes one or more computer instructions or computer programs. When the program instructions or the computer programs are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example. A and/or B may represent the following three cases: Only A exists, both A and B exist, and only B exists. A and B may be singular or plural. In addition, the character "/" in this specification usually indicates an "or" relationship between the associated objects, but may alternatively indicate an "and/or" relationship. For details, refer to the context for understanding.

In this application. "at least one" means one or more, and "a plurality of" means two or more. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (RAM), a magnetic disk, an optical disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink acknowledgement information transmission method, applied to a terminal device, wherein the method comprises:

obtaining, by the terminal device, a plurality of first hybrid automatic repeat request-acknowledgement (HARQ-ACK) codebooks, wherein each of the plurality of first HARQ-ACK codebooks comprises HARQ-ACK information of at least one downlink data channel, wherein each first HARQ-ACK codebook corresponds to one first radio network temporary identifier (RNTI), and wherein first RNTIs corresponding to the first HARQ-ACK codebooks are different;

obtaining, by the terminal device, indication information indicating the terminal device to concatenate the at least one of the plurality of HARQ-ACK codebooks in a preset order;

concatenating, by the terminal device, the at least one of the plurality of first HARQ-ACK codebooks in the preset order based on the indication information, to obtain a second HARQ-ACK codebook; and sending, by the terminal device, a physical uplink channel to a network device, wherein the physical uplink channel carries a second HARQ-ACK codebook, wherein the second HARQ-ACK codebook comprises at least one of the plurality of first HARQ-ACK codebooks that are concatenated in a preset order, and wherein the preset order is determined based on a plurality of first RNTIs corresponding to the plurality of first HARQ-ACK codebooks.

2. The method according to claim 1, wherein the plurality of first HARQ-ACK codebooks comprise a third HARQ-ACK codebook and a fourth HARQ-ACK codebook, wherein the third HARQ-ACK codebook comprises HARQ-ACK information of at least one first downlink data channel, wherein the fourth HARQ-ACK codebook comprises HARQ-ACK information of at least one second downlink data channel, and wherein there is an intersection between time domain resources occupied by the at least one first downlink data channel and the at least one second downlink data channel.

3. The method according to claim 1, wherein the indication information comprises a first value or a second value, and the method further comprises:

based on the indication information comprising the first value, concatenating, by the terminal device, the plurality of first HARQ-ACK codebooks in the preset order to obtain the second HARQ-ACK codebook.

4. The method according to claim 1, further comprising:

based on the indication information comprising a second value, removing, by the terminal device, HARQ-ACK information of at least one first downlink data channel from a third HARQ-ACK codebook, and concatenating a processed third HARQ-ACK codebook and a first HARQ-ACK codebook other than the third HARQ-ACK codebook in the plurality of first HARQ-ACK codebooks in the preset order to obtain the second HARQ-ACK codebook; or based on the indication information comprising the second value, removing, by the terminal device, the HARQ-ACK information of at least one second downlink data channel from a fourth HARQ-ACK codebook, and concatenating a processed fourth HARQ-ACK codebook and a first HARQ-ACK codebook other than the fourth HARQ-ACK codebook in the plurality of first HARQ-ACK codebooks in the preset order to obtain the second HARQ-ACK codebook.

5. The method according to claim 1, wherein obtaining the indication information comprises:

receiving, by the terminal device, higher layer signaling comprising the indication information; or receiving, by the terminal device, downlink control information (DCI) comprising the indication information.

6. The method according to claim 1, wherein the preset order comprises:

arranging in descending order of the first RNTIs corresponding to the first HARQ-ACK codebooks; or arranging in ascending order of the first RNTIs corresponding to the first HARQ-ACK codebooks.

7. The method according to claim 1, wherein the first RNTI comprises a cell radio network temporary identifier (C-RNTI) and/or a group radio network temporary identifier (G-RNTI), and wherein the preset order comprises that a first HARQ-ACK codebook corresponding to the C-RNTI is before or after a first HARQ-ACK codebook corresponding to the G-RNTI.

8. The method according to claim 6, wherein the first RNTI comprises a cell radio network temporary identifier (C-RNTI) and/or a group radio network temporary identifier (G-RNTI), and wherein the preset order comprises that first HARQ-ACK codebooks corresponding to a plurality of G-RNTIs arranged in descending or ascending order of the G-RNTIs corresponding to the first HARQ-ACK codebooks.

9. The method according to claim 1, wherein obtaining the indication information comprises obtaining, by the terminal device, capability information of the terminal device, wherein the capability information indicates whether the terminal device supports frequency division multiplexing, and wherein the capability information comprises the indication information.

10. An uplink acknowledgement information transmission method, applied to a network device, wherein the method comprises:

receiving, by the network device, a physical uplink channel from a terminal device, wherein the physical uplink channel carries a second hybrid automatic repeat request-acknowledgement (HARQ-ACK) codebook, wherein the second HARQ-ACK codebook comprises at least one of a plurality of first HARQ-ACK codebooks concatenated in a preset order, wherein each of the plurality of first HARQ-ACK codebooks comprises HARQ-ACK information of at least one downlink data channel, wherein each first HARQ-ACK codebook corresponds to one first radio network temporary identifier (RNTI), wherein first RNTIs corresponding to the first HARQ-ACK codebooks are different, wherein the preset order is determined based on a plurality of first RNTIs associated with the plurality of first HARQ-ACK codebooks; and sending, by the network device, indication information to the terminal device, wherein the indication information indicates the terminal device to concatenate the at least one of the plurality of first HARQ-ACK codebooks in the preset order.

11. The method according to claim 10, wherein the plurality of first HARQ-ACK codebooks comprise a third HARQ-ACK codebook and a fourth HARQ-ACK codebook, wherein the third HARQ-ACK codebook comprises HARQ-ACK information of at least one first downlink data channel, wherein the fourth HARQ-ACK codebook comprises HARQ-ACK information of at least one second downlink data channel, and wherein there is an intersection between time domain resources occupied by the at least one first downlink data channel and the at least one second downlink data channel.

12. The method according to claim 11, wherein sending the indication information to the terminal device comprises:

sending, by the network device, downlink control information (DCI) to the terminal device, wherein the DCI comprises the indication information.

13. The method according to claim 11, wherein sending the indication information to the terminal device comprises:

sending, by the network device, higher layer signaling to the terminal device, wherein the higher layer signaling comprises the indication information.

14. The method according to claim 11, further comprising:

obtaining, by the network device, capability information of the terminal device, wherein the capability information indicates whether the terminal device supports frequency division multiplexing, and wherein the capability information comprises the indication information.

15. An uplink acknowledgement information transmission apparatus comprising at least one processor coupled to at least one memory storing instructions and configured to execute the instructions to cause the apparatus to perform:

obtaining a plurality of first hybrid automatic repeat request-acknowledgement (HARQ-ACK) codebooks, wherein each of the plurality of first HARQ-ACK codebooks comprises HARQ-ACK information of at least one downlink data channel, wherein each first HARQ-ACK codebook corresponds to one first radio network temporary identifier (RNTI), and wherein first RNTIs corresponding to the first HARQ-ACK codebooks are different;

obtaining indication information that indicates to a terminal device to concatenate the at least one of the plurality of first HARQ-ACK codebooks in a preset order;

concatenating the at least one of the plurality of first HARQ-ACK codebooks in the preset order based on the indication information to obtain a second HARQ-ACK codebook; and sending a physical uplink channel that carries a second HARQ-ACK codebook that comprises at least one of the plurality of first HARQ-ACK codebooks concatenated in a preset order, wherein the preset order is determined based on a plurality of first RNTIs corresponding to the plurality of first HARQ-ACK codebooks.

16. The apparatus according to claim 15, wherein the plurality of first HARQ-ACK codebooks comprise a third HARQ-ACK codebook and a fourth HARQ-ACK codebook, wherein the third HARQ-ACK codebook comprises HARQ-ACK information of at least one first downlink data channel, wherein the fourth HARQ-ACK codebook comprises HARQ-ACK information of at least one second downlink data channel, and wherein there is an intersection between time domain resources occupied by the at least one first downlink data channel and the at least one second downlink data channel.

17. The apparatus according to claim 15, wherein obtaining the indication information comprises:

receiving higher layer signaling that comprises the indication information; or receiving, downlink control information (DCI) that comprises the indication information.

18. The apparatus according to claim 15, wherein the preset order comprises arranging in descending or ascending order of the first RNTIs corresponding to the first HARQ-ACK codebooks.

19. The apparatus according to claim 15, wherein the first RNTI comprises a cell radio network temporary identifier (C-RNTI) and/or a group radio network temporary identifier (G-RNTI), and wherein the preset order comprises a first HARQ-ACK codebook associated with the C-RNTI is before or after a first HARQ-ACK codebook associated with the G-RNTI.

20. The apparatus according to claim 15, wherein obtaining the indication information comprises:

obtaining capability information of the terminal device, wherein the capability information indicates whether the terminal device supports frequency division multiplexing, and the capability information comprises the indication information.

\* \* \* \* \*